(12) United States Patent
Yamafuku et al.

(10) Patent No.: US 10,319,957 B2
(45) Date of Patent: Jun. 11, 2019

(54) ENERGY STORAGE DEVICE AND ENERGY STORAGE APPARATUS

(71) Applicant: GS Yuasa International Ltd., Kyoto-shi (JP)

(72) Inventors: Taro Yamafuku, Kyoto (JP); Masaki Masuda, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 257 days.

(21) Appl. No.: 15/272,267

(22) Filed: Sep. 21, 2016

(65) Prior Publication Data

US 2017/0092901 A1 Mar. 30, 2017

(30) Foreign Application Priority Data

Sep. 24, 2015 (JP) ................. 2015-187059

(51) Int. Cl.
| | |
|---|---|
| H01M 2/02 | (2006.01) |
| H01M 2/20 | (2006.01) |
| H01M 10/0525 | (2010.01) |
| H01G 11/78 | (2013.01) |
| H01G 9/08 | (2006.01) |
| H01G 11/82 | (2013.01) |
| H01M 2/04 | (2006.01) |

(52) U.S. Cl.
CPC ............ *H01M 2/0277* (2013.01); *H01G 9/08* (2013.01); *H01G 11/78* (2013.01); *H01G 11/82* (2013.01); *H01M 2/022* (2013.01); *H01M 2/0217* (2013.01); *H01M 2/0267* (2013.01); *H01M 2/0404* (2013.01); *H01M 2/202* (2013.01); *H01M 10/0525* (2013.01); *Y02E 60/13* (2013.01)

(58) Field of Classification Search
CPC .......... H01M 10/0525; H01M 2/0217; H01M 2/022; H01M 2/0267; H01M 2/0277; H01M 2/0404; H01M 2/202; H01G 11/78; H01G 11/82; H01G 9/08; Y02E 60/13
See application file for complete search history.

(56) References Cited

U.S. PATENT DOCUMENTS

| | | | | |
|---|---|---|---|---|
| 5,681,668 A | * | 10/1997 | Reed .................. | H01M 2/1072 180/68.5 |
| 2009/0136843 A1 | * | 5/2009 | Yamamoto ............. | H01M 2/08 429/179 |
| 2011/0195301 A1 | | 8/2011 | Taniguchi et al. | |
| 2014/0106204 A1 | | 4/2014 | Tononishi | |

(Continued)

FOREIGN PATENT DOCUMENTS

| | | |
|---|---|---|
| JP | 2005-251397 A | 9/2005 |
| JP | 2007-250413 A | 9/2007 |
| JP | 2009-152183 A | 7/2009 |

(Continued)

*Primary Examiner* — Carlos Barcena
(74) *Attorney, Agent, or Firm* — McGinn IP Law Group, PLLC.

(57) ABSTRACT

An energy storage device includes a metal case which houses an electrode assembly therein, and an insulation sheet mounted on a portion of an outer surface of the case. The case includes a projecting portion which extends in a thickness direction of the insulation sheet along an edge surface of at least a portion of the insulation sheet, and a distal end of the projecting portion projects from the insulation sheet.

11 Claims, 10 Drawing Sheets

(56) References Cited

U.S. PATENT DOCUMENTS

2014/0205895 A1* 7/2014 Kim .................... H01M 2/0404
                                                                 429/179
2014/0220415 A1* 8/2014 Lim .................. H01M 10/4207
                                                                 429/156

FOREIGN PATENT DOCUMENTS

| JP | 2011-175942 A | 9/2011 |
| JP | 2011-181485 A | 9/2011 |
| JP | 2014-096357 A | 5/2014 |
| JP | 2014-103027 A | 6/2014 |

\* cited by examiner

ENERGY STORAGE DEVICE AND ENERGY STORAGE APPARATUS

CROSS-REFERENCE TO RELATED APPLICATIONS

This application claims the benefit of Japanese patent application No. 2015-187059, filed on Sep. 24, 2015, which is incorporated by reference.

FIELD

The present invention relates to an energy storage device including a metal case which houses an electrode assembly therein, and an insulation sheet mounted on an outer surface of the case.

BACKGROUND

Conventionally, there has been known a battery cell which includes an angular exterior can, electrode terminals mounted on an upper surface of the exterior can, and a waterproof sheet having insulating property which covers the exterior can (see JP 2011-175942 A). Edge portions of the waterproof sheet are made to overlap with each other on side surfaces of the exterior can, and the overlapped end portions of the waterproof sheet are thermally welded to each other thus forming the waterproof sheet into a bag having an opened upper portion. Although the waterproof sheet covers the side surfaces and a lower surface of the exterior can, an upper surface of the exterior can is not covered by the waterproof sheet so as to expose the electrode terminals and the like. Accordingly, an edge surface of the waterproof sheet is exposed upward, and a boundary between an outer surface of the exterior can and an edge surface of the waterproof sheet is also exposed upward.

With the configuration described above, in general, it is difficult to ensure sufficient adhesion between the exterior can and the waterproof sheet on a peripheral portion (upper end portion) of an opening of the waterproof sheet. Thus, a gap is liable to be formed at a boundary between the outer surface of the exterior can and the edge surface of the waterproof sheet. Since the boundary is exposed to the outside, there may be a case where a foreign substance (for example, water in the form of condensed dew) enters the gap from the outside. When the water which enters the gap expands due to the generation of heat in the battery cell, there is a possibility that the waterproof sheet is broken so that an insulating function of the waterproof sheet is impaired.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention to provide an energy storage device which can prevent breaking of an insulation sheet mounted on an outer surface of a case caused by intrusion of a foreign substance into a boundary between the outer surface of the case and an edge surface of the insulation sheet.

According to one aspect of the present invention, there is provided an energy storage device including a metal case which houses an electrode assembly therein, and an insulation sheet mounted on a portion of an outer surface of the case. The case includes a projecting portion which extends in a thickness direction of the insulation sheet along an edge surface of at least a portion of the insulation sheet, and a distal end of the projecting portion projects from the insulation sheet.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
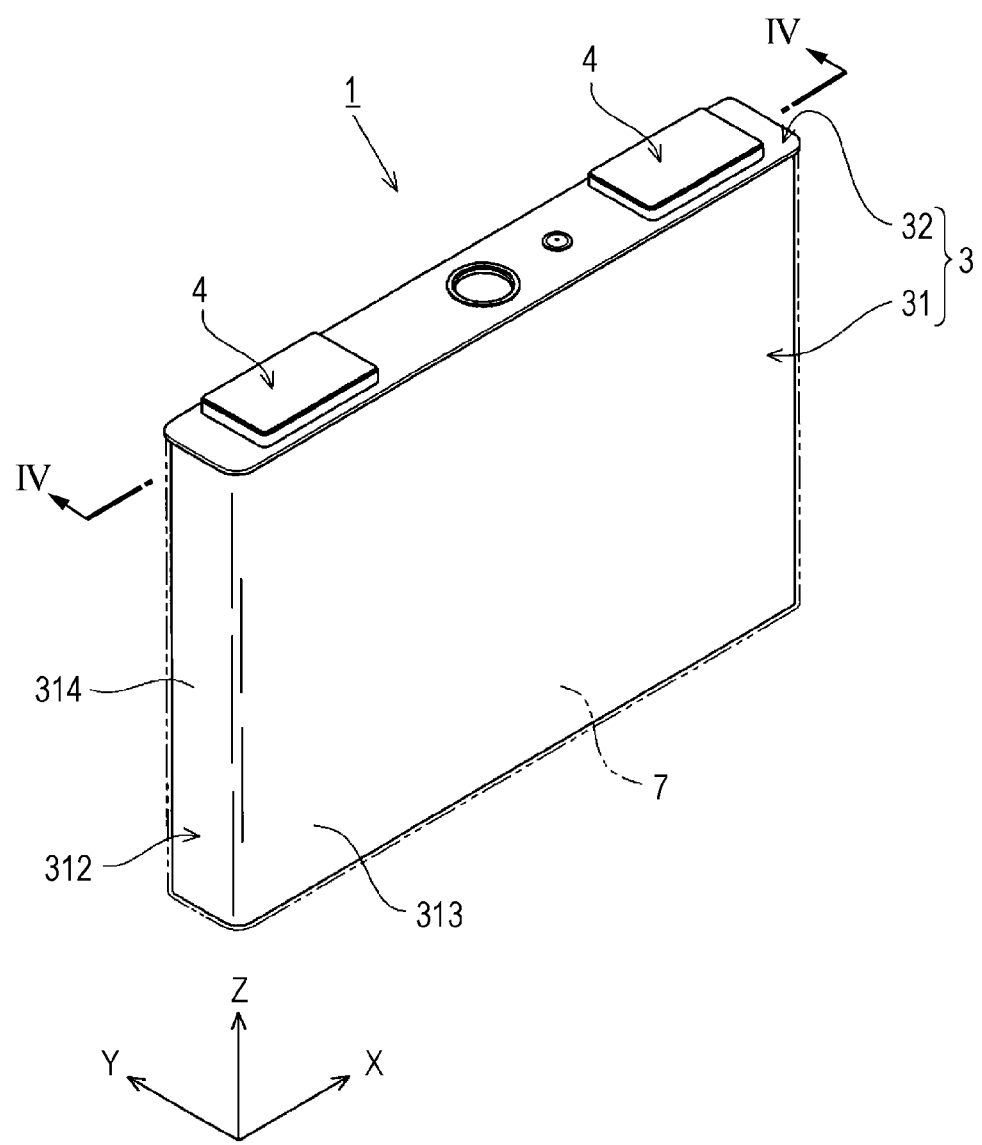
FIG. 1 is a perspective view of an energy storage device according to a first embodiment of the present invention.

According to an aspect of the present invention, there is provided an energy storage device including a metal case which houses an electrode assembly therein, and an insulation sheet mounted on a portion of an outer surface of the case. The case includes a projecting portion which extends in a thickness direction of the insulation sheet along an edge surface of at least a portion of the insulation sheet, and a distal end of the projecting portion projects from the insulation sheet.

With such a configuration, the projecting portion forms a barrier to any foreign substance which might enter a boundary between the outer surface of the case and the edge surface of the insulation sheet. Thus, the direct entrance of the foreign substance into the boundary can be suppressed. The adhesion of the foreign substance to the edge surface of the insulation sheet is also suppressed by the projecting portion and hence, the entrance of the foreign substance into the boundary along the edge surface of the insulation sheet can be also suppressed. Accordingly, it is possible to prevent breaking of the insulation sheet caused by the entrance of the foreign substance into the boundary between the outer surface of the case and the edge surface of the insulation sheet.

In the energy storage device, the projecting portion may be configured such that a distal end surface is formed on the distal end of the projecting portion, and an end edge of the distal end surface disposed on an edge surface side of the insulation sheet projects from the insulation sheet in a direction that the projecting portion projects.

With such a configuration, when the energy storage device is held in a posture where a direction along which the projecting portion faces the edge surface of the insulation sheet is the downward direction, a foreign substance (for example, water in the form of condensed dew) adhering to the distal end surface descends along the distal end surface due to its own weight, and the foreign substance is likely to fall from a lower end of the distal end surface. Further, the distal end surface is away from an area right above the edge surface of the insulation sheet. Therefore, the foreign substance minimally enters the boundary between the outer surface of the case and the edge surface of the insulation sheet. Accordingly, it is possible to prevent breaking of the insulation sheet caused by the entrance of the foreign substance into the boundary between the outer surface of the case and the edge surface of the insulation sheet more effectively.

In the energy storage device, the case may include a cylindrical case body having an opening portion, the case body formed such that the insulation sheet is mounted on the case body along at least a portion of a peripheral edge of the opening portion, and a lid plate covering the opening portion, and having a peripheral edge portion which forms the projecting portion.

With such a configuration, the peripheral edge portion of the lid plate is used as the projecting portion and hence, it is unnecessary to form the projecting portion additionally whereby the configuration of the energy storage device can be simplified.

According to the present invention, it is possible to provide an energy storage device which can prevent breaking of an insulation sheet mounted on an outer surface of a case caused by intrusion of a foreign substance into a boundary between the outer surface of the case and an edge surface of the insulation sheet.

Hereinafter, an energy storage device according to a first embodiment of the present invention is described with reference to FIG. 1 to FIG. 4. The energy storage device may be a primary battery, a secondary battery, a capacitor or the like. In the first embodiment, as one example of the energy storage device, a chargeable/dischargeable secondary battery is described. Names of respective constitutional members (respective constitutional elements) used in the first embodiment are exclusively for the first embodiment, and may differ from names of respective constitutional members (respective constitutional elements) used in BACKGROUND.

The energy storage device of the first embodiment is a non-aqueous electrolyte secondary battery. To be more specific, the energy storage device is a lithium ion secondary battery which makes use of the electron movement generated along with the movement of lithium ions. The energy storage device of this type supplies electrical energy. The energy storage device is used as a single or plural units. To be more specific, when a required output and a required voltage are small, the energy storage device is used as a single unit. On the other hand, when at least either one of a required output or a required voltage is large, the energy storage device is used in an energy storage apparatus such that the energy storage device is combined with other energy storage devices. In the energy storage apparatus, the energy storage device or the energy storage devices used in the energy storage apparatus supply electrical energy.

Figure 2:
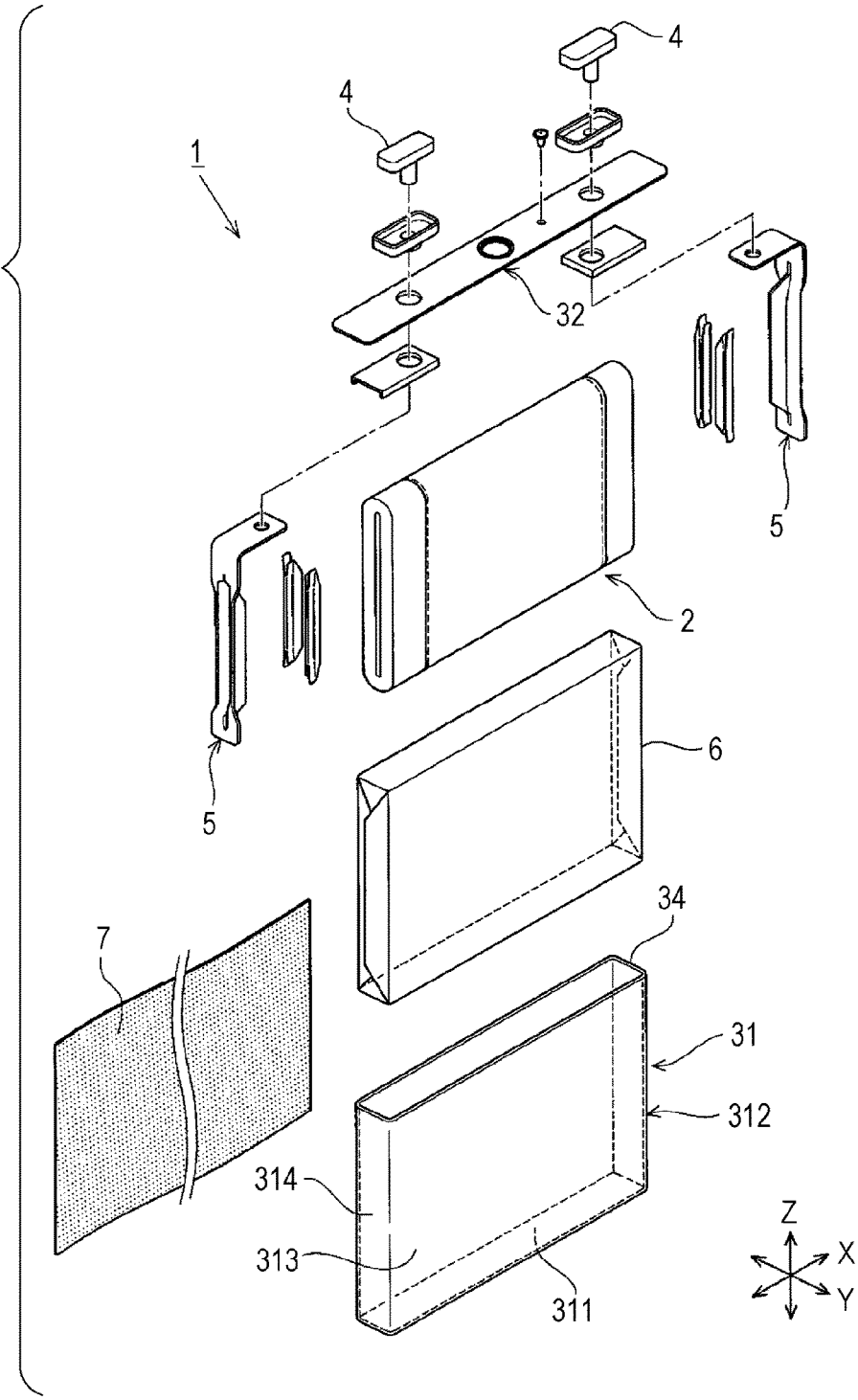
FIG. 2 is a developed view of the energy storage device.

As shown in FIG. 1 and FIG. 2, an energy storage device 1 includes an electrode assembly 2 which includes a positive electrode and a negative electrode; a case 3 which houses the electrode assembly 2 therein, and external terminals 4 which are disposed outside the case 3 and are conductive with the electrode assembly 2. The energy storage device 1 also includes current collectors 5 which make the electrode assembly 2 and the external terminals 4 conductive with each other, and an insulating member 6 which provides the insulation between the electrode assembly 2 and the case 3. The current collectors 5 and the insulating member 6 are disposed in the case 3. The energy storage device 1 further includes an insulation sheet 7 mounted on a portion of an outer surface of the case 3.

The case 3 includes a case body 31 having an opening, and a lid plate 32 which seals (closes) the opening of the case body 31. The case 3 stores an electrolyte solution therein together with the electrode assembly 2, the current collectors 5, and the like. The case 3 is made of metal having resistance against an electrolytic solution. The case 3 in the first embodiment is made of an aluminum-based metal material such as aluminum or an aluminum alloy, for example. The case 3 may be made of a metal material such as stainless steel or nickel, or may be made of a composite material or the like formed by adhering a resin such as nylon to aluminum.

The case 3 is formed by joining an opening peripheral edge portion 34 of the case body 31 and a peripheral edge portion of the lid plate 32 in an overlapping manner. The case 3 has an inner space defined by the case body 31 and the lid plate 32. In the first embodiment, the opening peripheral edge portion 34 of the case body 31 and the peripheral edge portion of the lid plate 32 are joined to each other by laser welding.

The case body 31 includes a plate-like closure portion 311 which has an inner surface directed to the inside of the case 3 and an outer surface directed to the outside of the case 3. The case body 31 also includes a cylindrical barrel portion 312 which is connected to a peripheral edge of the closure portion 311 and extends to an inner surface side of the closure portion 311 thus surrounding the inner surface of the closure portion 311.

The closure portion 311 is a portion which is positioned at a lower end of the case body 31 when the case body 31 is disposed with the opening directed upward (that is, a portion which forms a bottom wall of the case body 31 when the case body 31 is disposed with the opening directed upward). The closure portion 311 has a rectangular shape as viewed in the normal direction of the closure portion 311. Each of four corner portions of the closure portion 311 has an arcuate shape.

Hereinafter, as shown in FIG. 1, assume the long side direction of the closure portion 311 as the X axis direction, the short side direction of the closure portion 311 as the Y axis direction, and the normal direction of the closure portion 311 as the Z axis direction.

The barrel portion 312 in the first embodiment has an angular cylindrical shape. To be more specific, the barrel portion 312 has a flat angular cylindrical shape. The barrel portion 312 includes a pair of long wall portions 313 extending from long sides of a peripheral edge of the closure portion 311, and a pair of short wall portions 314 extending from short sides of the peripheral edge of the closure portion 311. That is, the long wall portions 313 forming a pair opposedly face each other in the Y axis direction with a gap (to be more specific, the gap having a size which corresponds to a size of the short side of the peripheral edge of the closure portion 311) therebetween. The short wall portions 314 forming a pair opposedly face each other in the X axis direction with a gap (to be more specific, the gap having a size which corresponds to a size of the long side of the peripheral edge of the closure portion 311) therebetween. Each short wall portion 314 connects corresponding end portions of the pair of long wall portions 313 (to be more specific, the end portions of the pair of long wall portions 313 which opposedly face each other in the Y axis direction) to each other thus forming the barrel portion 312 having an angular cylindrical shape. An outer surface of the barrel portion 312 is formed so as to extend in the Z axis direction from the peripheral edge of the closure portion 311. Accordingly, the size (outer size) of an outer periphery of the barrel portion 312 on a plane which includes the X axis direction and the Y axis direction is held at a fixed value throughout the height of the barrel portion 312 in the Z axis direction. To increase the inner space of the case 3 without increasing an outer size of the case 3, a wall thickness of each long wall portion 313 and a wall thickness of each short wall portion 314 are made small. For example, the wall thickness of the long wall portion 313 and the wall thickness of the short wall portion 314 are set to 1.00 mm or less.

As described above, the case body 31 has an angular cylindrical shape with one end portion in the opening direction (Z axis direction) thereof closed (that is, a bottomed angular cylindrical shape).

The lid plate 32 is a plate-like member which closes the opening of the case body 31. The lid plate 32 is brought into contact with the case body 31 so as to close the opening of the case body 31. To be more specific, the peripheral edge portion of the lid plate 32 is made to overlap with the opening peripheral edge portion 34 of the case body 31 such that the lid plate 32 closes the opening of the case body 31. In a state where the opening peripheral edge portion 34 and the lid plate 32 are made to overlap with each other, a boundary portion between the lid plate 32 and the case body 31 is welded. The case 3 is formed as described above.

The lid plate 32 has a profile shape which corresponds to the opening peripheral edge portion 34 of the case body 31 as viewed in the Z axis direction. That is, the lid plate 32 is formed of a plate member having a rectangular shape elongated in the X axis direction as viewed in the Z axis direction. Each of four corners of the lid plate 32 has an arcuate shape.

Figure 3:
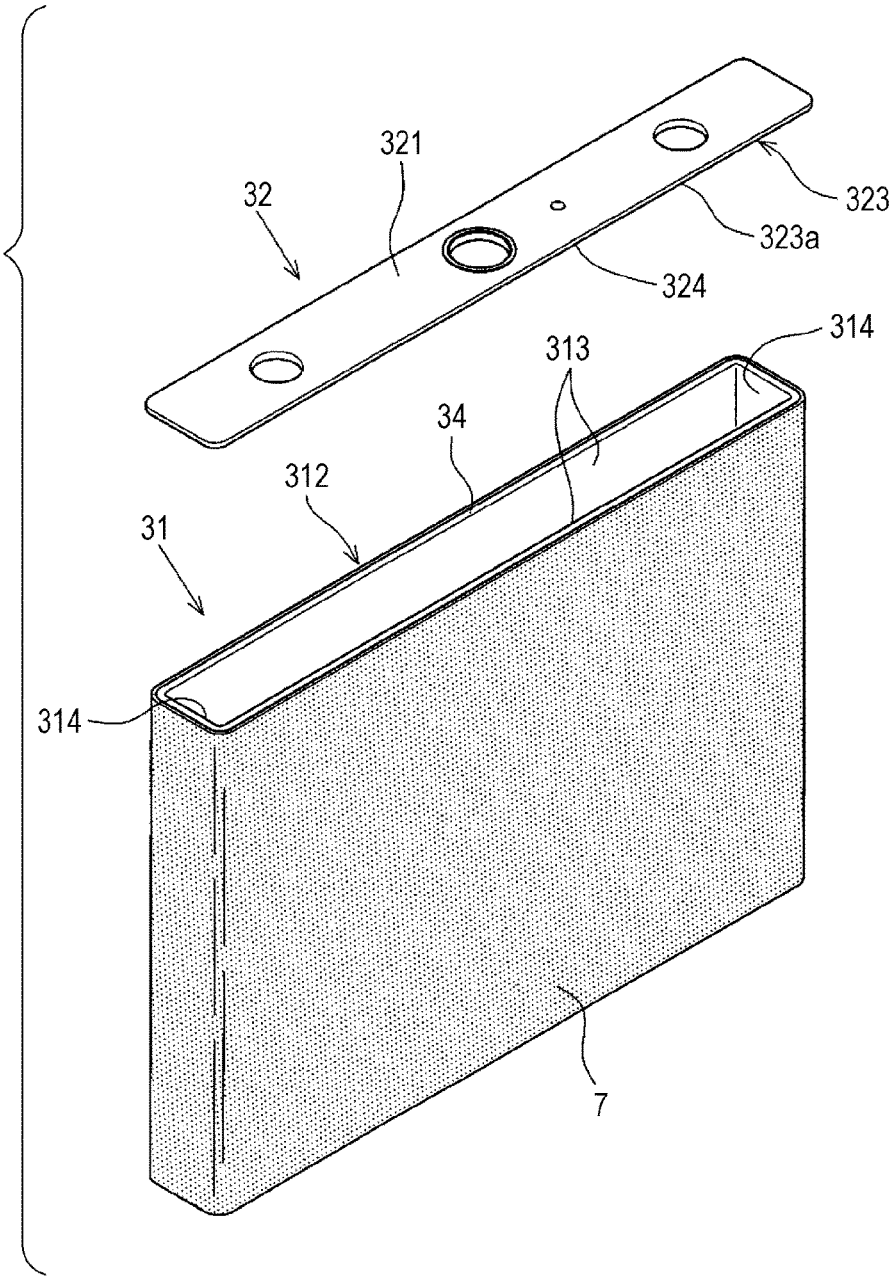
FIG. 3 is a developed view of a case and an insulation sheet.

As shown in FIG. 2, the insulation sheet 7 having a predetermined length which is cut from an elongated sheet is provided. As shown in FIG. 1 to FIG. 3, the insulation sheet 7 is mounted on the case body 31 such that the insulation sheet 7 surrounds the barrel portion 312 in a cylindrical shape along the opening peripheral edge portion 34. The insulation sheet 7 has insulating property, and may additionally have flame retardancy. The insulation sheet 7 is formed of a resin sheet and has resiliency. A thickness of the insulation sheet 7 is set to 50 µm to 100 µm, for example. In the first embodiment, the insulation sheet 7 is adhered to the outer surface of the barrel portion 312 by an adhesive agent. The size of the outer periphery of the barrel portion 312 has a fixed value throughout the height of the barrel portion 312 in the Z axis direction so that the size of an outer periphery of the insulation sheet 7 adhered to the outer surface of the barrel portion 312 also has a fixed value in the Z axis direction.

Figure 4:
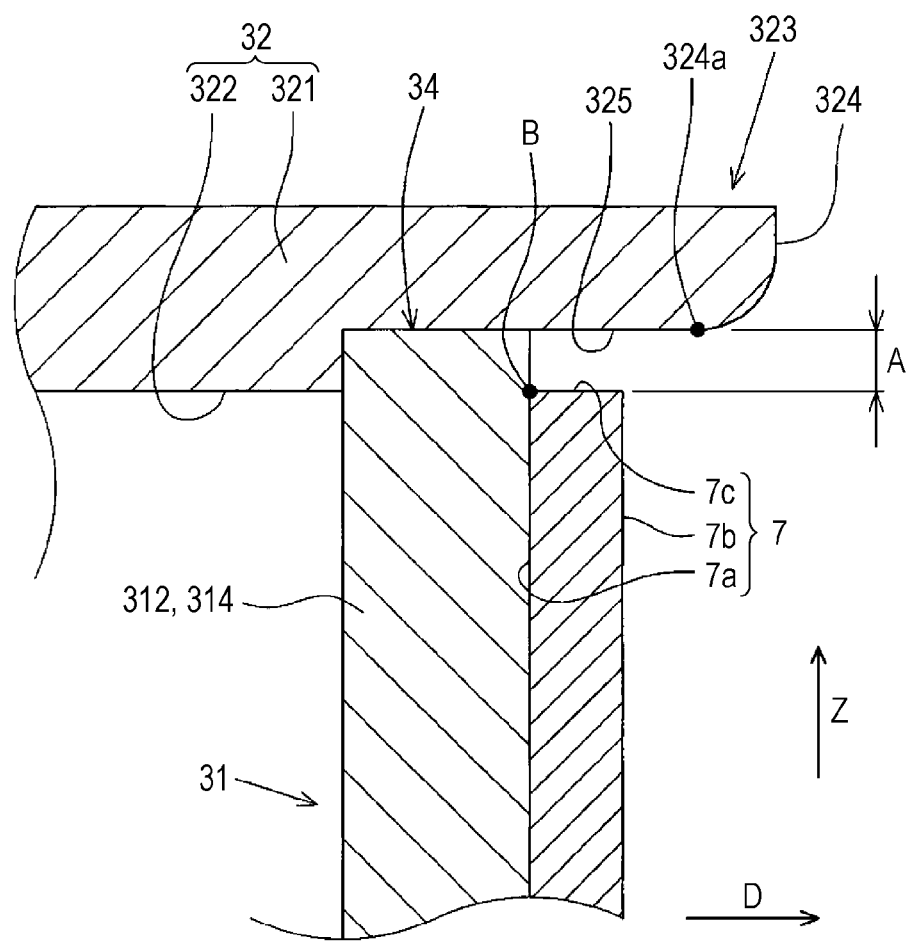
FIG. 4 is a cross-sectional view of a case body around an opening peripheral edge portion taken along a line IV-IV in FIG. 1.

As shown in FIG. 4, the insulation sheet 7 has an inner surface 7a which opposedly faces the outer surface of the barrel portion 312 (the short wall portion 314 in the embodiment shown in FIG. 4), an outer surface 7b which is disposed on a side opposite to the inner surface 7a, and an edge surface 7c which opposedly faces the lid plate 32. In the first embodiment, the edge surface 7c has an annular shape (perimeter shape) as viewed from above in the Z axis direction.

As shown in FIG. 4, the lid plate 32 includes a plate-like lid body 321, and a lid projecting portion 322 which projects toward the closure portion 311 of the case body 31 from the lid body 321.

The lid body 321 has a peripheral edge portion (projecting portion) 323 which is an annular portion extending along an outer periphery of the lid body 321. The peripheral edge portion 323 extends in the thickness direction of the insulation sheet 7 along the edge surface 7c. In the extending direction of the peripheral edge portion 323, a distal end of the peripheral edge portion 323 projects from the outer surface 7b of the insulation sheet 7. A distal end surface 324 is formed on a distal end of the peripheral edge portion 323. Corresponding to the structure where the insulation sheet 7 is disposed along the opening peripheral edge portion 34, the peripheral edge portion 323 projects perpendicular to the Z axis direction toward the outside from the inside of the lid body 321 over the entire outer periphery of the lid body 321. Accordingly, the distal end surface 324 is an annular surface. In the description made hereinafter, the direction along which the peripheral edge portion 323 projects (extends) is assumed as "projecting direction D".

As viewed in the Z axis direction, the outer periphery of the lid body 321 is disposed outside the outer periphery of the barrel portion 312. Both in the X axis direction and in the Y axis direction, the difference in size between the lid body 321 and the barrel portion 312 is set to 0.2 mm or more, for example. Accordingly, the distance in the projecting direction D between the distal end surface 324 and the outer surface of the barrel portion 312 is set to 0.1 mm or more.

The peripheral edge portion 323 has an inner surface 325 which is continuously formed with the distal end surface 324 and opposedly faces the edge surface 7c of the insulation sheet 7. An end edge 324a of the distal end surface 324 disposed on an edge surface 7c side of the insulation sheet 7 is disposed on a boundary between the distal end surface 324 and the inner surface 325. The end edge 324a of the distal end surface 324 projects from the outer surface 7b of the insulation sheet 7 in the projecting direction D. In the first embodiment, a rounded portion is formed on the distal end surface 324 in the vicinity of the end edge 324a. The rounded portion is formed in such a manner that a portion of an outer peripheral surface of the peripheral edge portion 323 having a uniform wall thickness is melted at the time of joining the opening peripheral edge portion 34 of the case body 31 and the peripheral edge portion of the lid plate 32 to each other by laser welding.

In FIG. 4, for the sake of convenience of the illustration and the description, a distance A between the edge surface 7c of the insulation sheet 7 and the inner surface 325 of the peripheral edge portion 323 is depicted in a relatively large scale. In mounting the insulation sheet 7 on the case body 31, it is preferable that the edge surface 7c of the insulation sheet 7 be positioned as close as possible to the inner surface 325 of the peripheral edge portion 323. This is because the narrower the distance A is, the more difficult a foreign substance enters a boundary B between the outer surface of the barrel portion 312 and the edge surface 7c of the insulation sheet 7. The distance A is set to 0.5 mm, for example, and is preferably set to 0.1 mm.

The lid projecting portion 322 is formed such that an outer peripheral surface of the lid projecting portion 322 is substantially brought into contact with an inner peripheral surface of the barrel portion 312 (short wall portions 314). With such a configuration, when the lid plate 32 is mounted on the case body 31, the lid projecting portion 322 can be positioned with respect to the case body 31.

Figure 5:
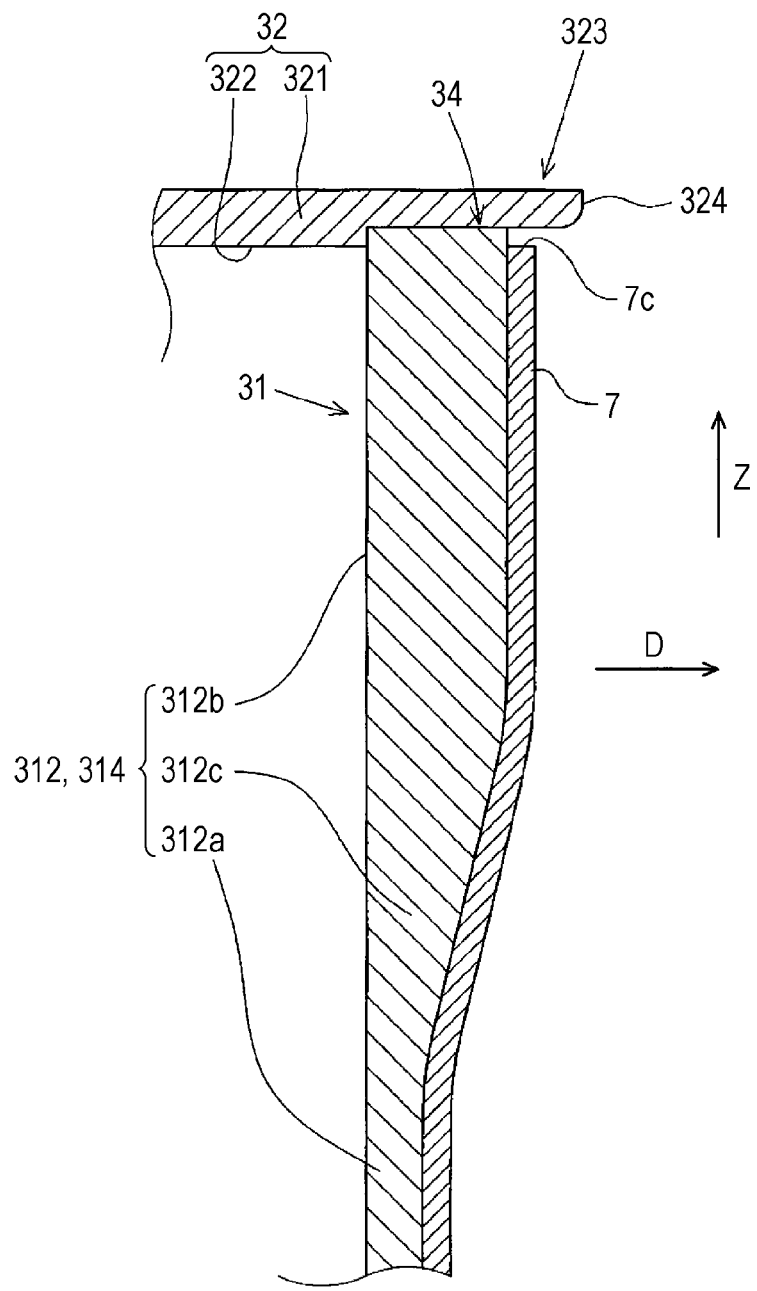
FIG. 5 is a cross-sectional view of a portion of a case body according to a second embodiment around an opening peripheral edge portion.

An energy storage device 1 according to a second embodiment is described with reference to FIG. 5. Constitutional elements in the second embodiment which are substantially equal to the constitutional elements in the first embodiment are given the same symbols so that the detailed description of these constitutional elements is not repeated, and only the constitutional elements which make the second embodiment different from the first embodiment are described in detail.

A case body 31 in the second embodiment is formed such that a portion of the case body 31 in the periphery of an opening peripheral edge portion 34 has a large wall thickness. In performing laser welding, a laser beam is irradiated to a boundary between the case body 31 and a lid plate 32 in the direction perpendicular to the Z axis direction. With such a configuration, a depth of a welded portion in the welding direction formed by laser welding can be increased. A barrel portion 312 includes a reference portion 312a disposed close to a closure portion 311, a thick wall portion 312b having the opening peripheral edge portion 34, and a connecting portion 312c which connects the reference portion 312a and the thick wall portion 312b to each other. As shown in FIG. 5, an outer surface of the thick wall portion 312b projects from an outer surface of the reference portion 312a in the projecting direction D, and an outer surface of the connecting portion 312c is connected to the outer surface of the thick wall portion 312b and the outer surface of the reference portion 312a. An inner surface of the thick wall portion 312b, an inner surface of the reference portion 312a, and an inner surface of the connecting portion 312c are made coplanar with each other. Accordingly, the barrel portion 312 has the largest wall thickness at the thick wall portion 312b.

A size (outer size) of an outer periphery of the barrel portion 312 changes in the Z axis direction so that a size of an outer periphery of an insulation sheet 7 adhered to the outer surface of the barrel portion 312 also changes in the Z axis direction. In this embodiment, as shown in FIG. 2, the insulation sheet 7 is wound around the outer surface of the barrel portion 312 such that the longitudinal direction of the insulation sheet 7 agrees with the outer circumferential direction of the barrel portion 312. Accordingly, the insulation sheet 7 adhered to the outer surface of the barrel portion 312 is stretched at a portion where a size of the outer periphery of the barrel portion 312 is relatively large. To be more specific, the insulation sheet 7 is stretched at the thick wall portion 312b. The insulation sheet 7 is adhered to the barrel portion 312 more closely at a stretched portion of the insulation sheet 7 due to an elastic force of the insulation sheet 7 in addition to an adhesive force of an adhesive agent. With such a configuration, a gap is minimally formed at a boundary B between the outer surface of the barrel portion 312 and an edge surface 7c of the insulation sheet 7. According to the energy storage device 1 of the second embodiment, a foreign substance minimally enters the boundary B.

Figure 6:
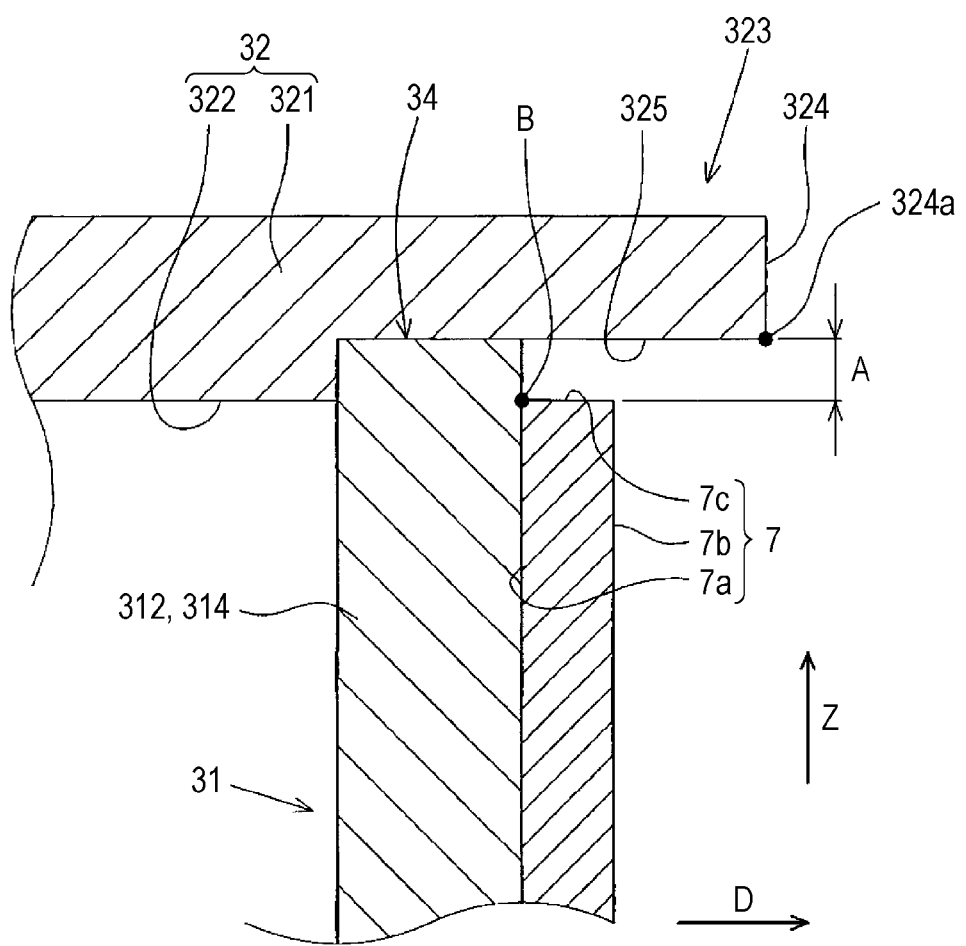
FIG. 6 is a cross-sectional view of a portion of a case body according to a third embodiment around an opening peripheral edge portion.

An energy storage device 1 according to a third embodiment is described with reference to FIG. 6. Constitutional elements in the third embodiment which are substantially equal to the constitutional elements in the first embodiment are given the same symbols so that the detailed description of these constitutional elements is not repeated, and only the constitutional elements which make the third embodiment different from the first embodiment are described in detail.

A peripheral edge portion 323 in the third embodiment has a uniform thickness. That is, the rounded portion in the first embodiment is not formed on a distal end surface 324 of the peripheral edge portion 323 in the third embodiment. In the third embodiment, a case body 31 and a lid plate 32 are fixed to each other by fastening using, for example, bolts and nuts in place of laser welding.

Figure 7:
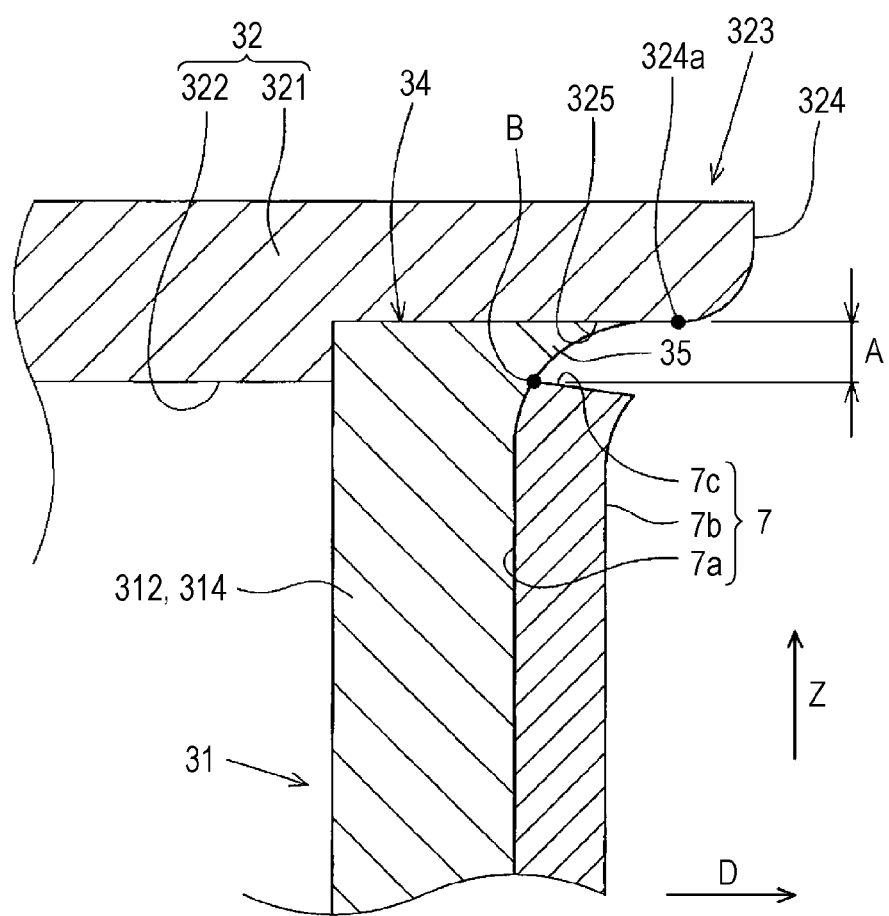
FIG. 7 is a cross-sectional view of a portion of a case body according to a fourth embodiment around an opening peripheral edge portion.

An energy storage device 1 according to a fourth embodiment is described with reference to FIG. 7. Constitutional elements in the fourth embodiment which are substantially equal to the constitutional elements in the first embodiment are given the same symbols so that the detailed description of these constitutional elements is not repeated, and only the constitutional elements which make the fourth embodiment different from the first embodiment are described in detail.

In the energy storage device 1 according to the fourth embodiment, a barrel portion 312 has a rounded portion 35 formed between the barrel portion 312 and a peripheral edge portion 323 of a lid body 321 on a periphery of an opening peripheral edge portion 34. The rounded portion 35 is a thick wall portion in this embodiment. The rounded portion 35 is formed in such a manner that a portion of the barrel portion 312 and a portion of the peripheral edge portion 323 are melted at the time of joining the opening peripheral edge portion 34 of a case body 31 and a peripheral edge portion of a lid plate 32 to each other by laser welding. The R portion 35 is formed such that as the R portion 35 extends to the opening peripheral edge portion 34 along the Z axis direction, an outer periphery of the barrel portion 312 gradually expands in the projecting direction D.

An insulation sheet 7 is disposed such that an edge surface 7c which oppositely faces a lid plate 32 is brought into contact with the rounded portion 35 of the barrel portion 312. Accordingly, in a region where the insulation sheet 7 oppositely faces the rounded portion 35, the insulation sheet 7 is stretched in the projecting direction D as the insulation sheet 7 extends to the edge surface 7c along the Z axis direction. Accordingly, in the case where a heat-shrinkable film is used as the insulation sheet 7, for example, as the insulation sheet 7 extends to the edge surface 7c along the Z axis direction, close contact property of the insulation sheet 7 to the barrel portion 312 is enhanced. Therefore, it is possible to effectively prevent the entrance of a foreign substance into a boundary B between an outer surface of the barrel portion 312 and the edge surface 7c of the insulation sheet 7.

An energy storage device 1 according to a fifth embodiment is described with reference to FIG. 8. Constitutional elements in the fifth embodiment which are substantially equal to the constitutional elements in the first embodiment are given the same symbols so that the detailed description of these constitutional elements is not repeated, and only the constitutional elements which make the fifth embodiment different from the first embodiment are described in detail.

Figure 8:
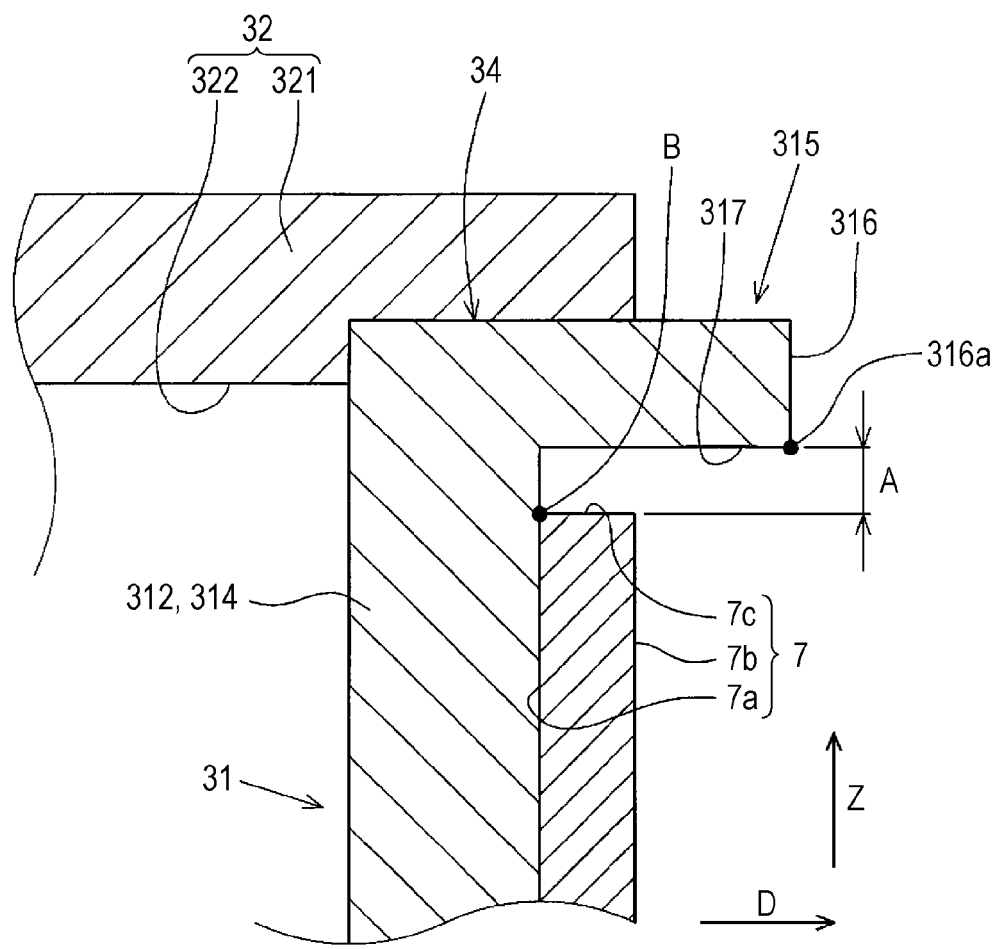
FIG. 8 is a cross-sectional view of a portion of a case body according to a fifth embodiment around an opening peripheral edge portion.

As shown in FIG. 8, in the fifth embodiment, a barrel portion 312 includes a projecting portion 315 which extends in the thickness direction of an insulation sheet 7 along an edge surface 7c of the insulation sheet 7. The projecting portion 315 is disposed on an opening peripheral edge portion 34, and is brought into contact with a lid body 321. The projecting portion 315 extends in the thickness direction of the insulation sheet 7 along the edge surface 7c. In the extending direction of the projecting portion 315, a distal end of the projecting portion 315 projects from an outer surface 7b of the insulation sheet 7. A distal end surface 316 is formed on the distal end of the projecting portion 315. The projecting portion 315 projects to the outside from the inside of the barrel portion 312 over the entire outer periphery of the barrel portion 312. Accordingly, the distal end surface 316 is an annular surface. In the fifth embodiment, the direction along which the projecting portion 315 projects (extends) is assumed as a projecting direction D.

The projecting portion 315 has an inner surface 317 which is connected to the distal end surface 316 and opposedly faces the edge surface 7c of the insulation sheet 7. An end edge 316a of the distal end surface 316 disposed on an edge surface 7c side of the insulation sheet 7 is disposed on a boundary between the distal end surface 316 and the inner surface 317. The end edge 316a of the distal end surface 316 projects from the edge surface 7c of the insulation sheet 7 in the projecting direction D.

Figure 9:
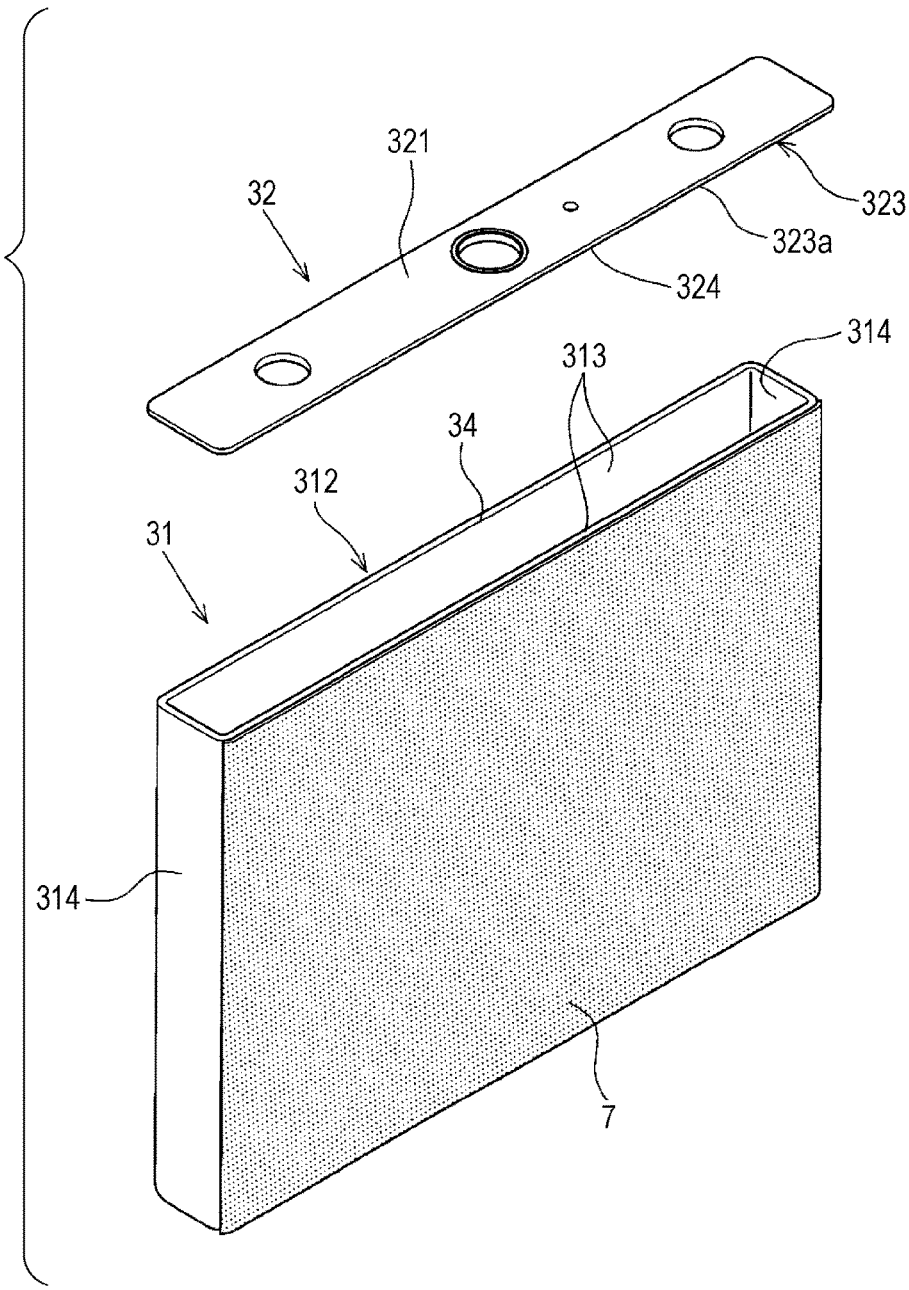
FIG. 9 is a developed view of a case and an insulation sheet according to a sixth embodiment.

An energy storage device 1 according to a sixth embodiment is described with reference to FIG. 9. Constitutional elements in the sixth embodiment which are substantially equal to the constitutional elements in the first embodiment are given the same symbols so that the detailed description of these a constitutional elements is not repeated, and only the constitutional elements which make the sixth embodiment different from the first embodiment are described in detail.

In the sixth embodiment, an insulation sheet 7 is mounted on a case body 31 along a portion of an opening peripheral edge portion 34. To be more specific, the insulation sheet 7 is mounted only on one long wall portion 313. A peripheral edge portion 323 of a lid plate 32 in the sixth embodiment includes a projecting portion 323a which extends in the thickness direction of the insulation sheet 7 along an edge surface 7c of the insulation sheet 7 mounted on the long wall portion 313. In the extending direction of the projecting portion 323a, a distal end of the projecting portion 323a projects from the insulation sheet 7. In the sixth embodiment, only a portion of the peripheral edge portion 323 which extends along the long wall portion 313 on which the insulation sheet 7 is mounted forms the projecting portion 323a. Portions of the peripheral edge portion 323 which extend along the long wall portion 313 and two short wall portions 314 on which the insulation sheet 7 is not mounted have outer peripheral surfaces which are positioned substantially coplanar with an outer surface of the barrel portion 312.

According to the respective energy storage devices 1 of the first to sixth embodiments, the projecting portion (the peripheral edge portion 323, the projecting portion 315, the projecting portion 323a) forms a barrier to any foreign substance which might enter the boundary B between the outer surface of the case 3 and the edge surface 7c of the insulation sheet 7 and hence, the direct entrance of the foreign substance into the boundary B can be suppressed. Since the adhesion of the foreign substance to the edge surface 7c of the insulation sheet 7 is also suppressed by the projecting portion (the peripheral edge portion 323, the projecting portion 315, the projecting portion 323a) and hence, the entrance of the foreign substance into the boundary B along the edge surface 7c of the insulation sheet 7 can be also suppressed. Accordingly, it is possible to prevent breaking of the insulation sheet 7 caused by the entrance of the foreign substance into the boundary between the outer surface of the case 3 and the edge surface 7c of the insulation sheet 7.

According to the energy storage device 1 of the first to sixth embodiments, when the energy storage device 1 is held in a posture where a direction along which the projecting portion (the peripheral edge portion 323, the projecting portion 315, the projecting portion 323a) faces the edge surface 7c of the insulation sheet 7 is the downward direction, a foreign substance (for example, water in the form of condensed dew) adhering to the distal end surfaces 324, 316 descends along the distal end surfaces 324, 316 due to its own weight, and the foreign substance is likely to fall from the lower end of the distal end surface 324, 316. Further, the distal end surfaces 324, 316 are away from an area right above the edge surface 7c of the insulation sheet 7. Therefore, the foreign substance minimally enters the boundary B between the outer surface of the case 3 and the edge surface 7c of the insulation sheet 7. Accordingly, it is possible to prevent more effectively breaking of the insulation sheet 7 caused by the entrance of the foreign substance into the boundary B between the outer surface of the case 3 and the edge surface 7c of the insulation sheet 7.

According to the energy storage device 1 of the first to fourth embodiments and the sixth embodiment, the peripheral edge portion 323 of the lid plate 32 is used as the projecting portion and hence, it is unnecessary to form the projecting portion additionally whereby the configuration of the energy storage device 1 can be simplified.

It is needless to say that the energy storage device of the present invention is not limited to the above-mentioned embodiment, and various modifications are conceivable without departing from the gist of the present invention. For example, the configuration of another embodiment may be added to the configuration of one embodiment. Alternatively, a part of the configuration of one embodiment may be replaced with the configuration of another embodiment. Further, a part of the configuration of one embodiment may be omitted.

In the first to fifth embodiments, the insulation sheet 7 is mounted on the barrel portion 312 such that the insulation sheet 7 surrounds the barrel portion 312 in a cylindrical shape. In the sixth embodiment, the insulation sheet 7 is mounted on the barrel portion 312 such that the insulation sheet 7 covers one long wall portion 313 of the barrel portion 312. That is, in the first to sixth embodiments, the insulation sheet 7 is mounted on a portion of the case body 31. However, the arrangement of the insulation sheet 7 is not limited to the above-mentioned arrangement. The insulation sheet 7 may be mounted on both the outer surface of the case body 31 and the outer surface of the lid plate 32. Alternatively, the insulation sheet 7 may be mounted only on the outer surface of the lid plate 32. When the insulation sheet 7 is mounted on the case body 31, for example, the insulation sheet 7 may be mounted on the entire outer surface of the case body 31 except for the opening peripheral edge portion 34 such that the insulation sheet 7 has a bottomed cylindrical shape.

In the first to fourth embodiments and the sixth embodiment, the projecting portion (the peripheral edge portion 323, the projecting portion 323a) is formed of the peripheral edge portion 323 of the lid plate 32. The configuration where the projecting portion is formed on the lid plate 32 is not limited to the above-mentioned configuration. The projecting portion may be configured such that the insulation sheet 7 is mounted on a main surface (outer surface) of the lid plate 32, and the projecting portion is formed along an edge surface of the insulation sheet 7. It is sufficient that the projecting portion be formed of a portion of the case 3. Accordingly, in place of forming the projecting portion on the lid plate 32, the projecting portion may be formed on the case body 31 as in the case of the fifth embodiment. In the fifth embodiment, the projecting portion 315 which is formed on the case body 31 is formed along the opening peripheral edge portion 34. However, the configuration of the projecting portion 315 is not limited to such a configuration. The projecting portion may be formed on the case body 31 at a desired position which is different from the opening peripheral edge portion 34 in the Z axis direction. For example, the projecting portion may be formed on a middle portion of the barrel portion 312 along the outer periphery of the barrel portion 312. The projecting portion may be formed along the Z axis direction at a desired position on the outer periphery of the barrel portion 312.

In the first to fifth embodiments, the projecting portion (the peripheral edge portion 323, the projecting portion 315) is disposed along the edge surface 7c close to the lid plate 32 out of two edge surfaces of the insulation sheet 7 formed into a cylindrical shape. In the sixth embodiment, the projecting portion 323a is disposed along the edge surface 7c close to the lid plate 32 out of four edge surfaces of the insulation sheet 7 formed into a rectangular shape. The configuration where the projecting portion is disposed along the edge surface of a portion of the insulation sheet 7 is not limited to the above-mentioned configuration. For example, in the energy storage device 1 according to the first embodiment, in place of the lid plate 32 where the entire peripheral edge portion 323 forms the projecting portion, the lid plate 32 in the fifth embodiment where a portion of the peripheral edge portion 323 forms the projecting portion 323a may be adopted. In this case, the projecting portion 323a covers only a portion of the edge surface 7c of the insulation sheet 7 having a cylindrical shape. The projecting portion may be disposed along all edge surfaces of the insulation sheet 7. For example, in the first embodiment, to dispose the projecting portion along both two edge surfaces of the insulation sheet 7 formed into a cylindrical shape respectively, another projecting portion may be disposed along a peripheral edge portion of the closure portion 311 in addition to the peripheral edge portion 323 which forms the projecting portion.

In the first to sixth embodiments, the entire distal end surfaces 324, 316 projects from the outer surface 7b of the insulation sheet 7 in the projecting direction D. It is sufficient that the distal end of the projecting portion project from the outer surface 7b of the insulation sheet 7 in the projecting direction D, and the projecting portion is not limited to the above-mentioned configuration. For example, the configuration may be adopted where although a portion of a distal end surface projects from the insulation sheet 7 in the projecting direction D, a remaining portion of the distal end surface does not project from the insulation sheet 7 in the projecting direction D.

In the first to sixth embodiments, the insulation sheet 7 is mounted on the case body 31 using an adhesive agent. The adhesive agent may be provided to the insulation sheet 7 in the form of an adhesive agent layer. The configuration for mounting the insulation sheet 7 on the case body 31 is not limited to the above-mentioned configuration. The insulation sheet 7 may be mounted on the case body 31 by shrink packaging. In this case, the insulation sheet 7 is made of a heat-shrinkable material.

In the second and fourth embodiments, as viewed in the Z axis direction, a size of the outer periphery of a portion of the case body 31 where the insulation sheet 7 is mounted is gradually increased as the case body 31 extends to the lid plate 32. However, the portion of the outer periphery of the case body 31 on which the insulation sheet 7 is mounted may have an approximately uniform size as shown in FIG. 3. When the outer periphery of the case body 31 has an approximately uniform size, the insulation sheet 7 can be easily and uniformly mounted on the case body 31. Since an approximately uniform tensile force is applied to the insulation sheet 7, for example, even when an extremely small notch occurs on an edge surface of an insulation sheet, the expansion of the notch can be suppressed.

In the above-mentioned embodiments, a foreign substance is a material having a possibility of entering the boundary B between the outer surface of the barrel portion 312 and the edge surface 7c of the insulation sheet 7. The foreign substance may be water in the form of condensed dew, for example. However, the foreign substance is not limited to water. The foreign substance may further contain at least one of the following: fine metal powder, cutting chips, dust and dirt. Fine metal powder and cutting chips are generated when working is applied to the energy storage device 1 on which the insulation sheet 7 is mounted, for example, when the external terminals 4 are mounted on the lid plate 32 by welding. In this case, there is a possibility that fine metal powder and cutting chips enter the boundary B. There is a concern that the metal fine powder and the cutting chip which enter the boundary B damage the insulation sheet 7. There is also a possibility that dust and dirt enter the boundary B. Particularly, when the energy storage device 1 is mounted on an apparatus which generates vibrations such as a vehicle, dust and dirt are suspended in air so that such a phenomenon is liable to occur. There is a concern that dust and dirt which enter the boundary B expand a gap formed on the boundary B.

In the above-mentioned embodiment, the description has been made with respect to the case where the energy storage device is the chargeable/dischargeable non-aqueous electrolyte secondary battery (for example, lithium ion secondary battery). However, a type and a size (capacities) of an energy storage device can be desirably selected. In the above-mentioned embodiment, the description has been made with respect to the lithium ion secondary battery as one example of the energy storage device. However, the present invention is not limited to the lithium ion secondary battery. For example, the present invention is also applicable to various secondary batteries, primary batteries, and energy storage devices of capacitors such as electric double layer capacitors.

Figure 10:
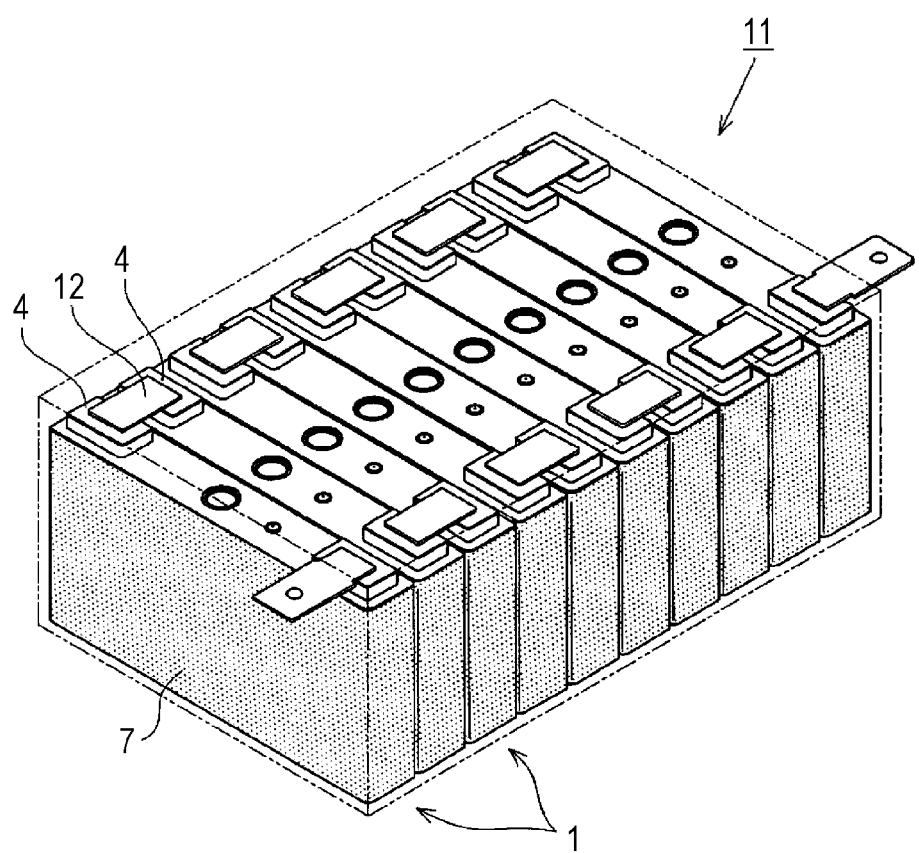
FIG. 10 is a perspective view of an energy storage apparatus which includes the energy storage devices according to the first embodiment.

The energy storage device (for example, battery) may be used in an energy storage apparatus (a battery module when an energy storage device is a battery) 11 shown in FIG. 10. The energy storage apparatus 11 includes at least two energy storage devices 1 and a bus bar member 12 which electrically connects two (different) energy storage devices 1 to each other. In this case, it is sufficient that the technique of the present invention is applied to at least one energy storage device 1.

What is claimed is:
1. An energy storage device comprising:
   a metal case which houses an electrode assembly therein; and
   an insulation sheet mounted on a portion of an outer surface of the case,
   wherein the case includes a projecting portion which extends in a thickness direction of the insulation sheet along an edge surface of at least a portion of the insulation sheet, and a distal end of the projecting portion projects beyond the insulation sheet, wherein the case includes a cylindrical case body having an opening portion, the case body formed such that the insulation sheet is mounted on the case body along at least a portion of a peripheral edge of the opening portion, and a lid plate covering the opening portion, and having a peripheral edge portion which forms the projecting portion.

2. An energy storage device comprising:

a case body having a peripheral wall which includes a pair of long wall portions and a pair of short wall portions, the peripheral wall defining an opening portion which opens in a first direction;

a lid plate extending in a second direction which intersects with the first direction and covering the opening portion; and an insulation sheet covering at least a portion of an outer surface of the peripheral wall, wherein a peripheral edge portion of the lid plate projects in the second direction beyond an outer surface of the insulation sheet.

3. An energy storage device comprising:

a case body having a peripheral wall which includes a pair of long wall portion and a pair of short wall portions, the peripheral wall defining an opening portion which opens in a first direction;

a lid plate extending in a second direction which intersects with the first direction and covering the opening portion; and an insulation sheet covering at least a portion of an outer surface of the peripheral wall, wherein a peripheral edge portion of the lid plate projects in the second direction beyond an outer surface of the insulation sheet, wherein the peripheral edge portion has a contact surface which is brought into contact with the peripheral wall in the first direction, and the peripheral wall is welded to the contact surface.

4. The energy storage device according to claim 3, wherein the peripheral edge portion further includes a distal end surface positioned on an end portion of the peripheral edge portion in the second direction, and a first rounded surface which connects the contact surface and the distal end surface to each other.

5. The energy storage device according to claim 4, wherein the distal end surface and the first rounded surface project in the second direction from the outer surface of the insulation sheet.

6. The energy storage device according to claim 3, wherein the peripheral wall has a wall portion which is brought into contact with the contact surface and a reference portion, and the peripheral wall is formed such that an outer size of the peripheral wall at the wall portion is set larger than the outer size of the peripheral wall at the reference portion.

7. The energy storage device according to claim 6, wherein the wall portion has a second rounded surface.

8. The energy storage device according to claim 6, wherein the peripheral wall is formed such that an inner size of the peripheral wall at the wall portion is equal to the inner size of the peripheral wall at the reference portion.

9. An energy storage device comprising:

a case body having a peripheral wall which includes a pair of long wall portions and a pair of short wall portions, the peripheral wall defining an opening portion which opens in a first direction;

a lid plate extending in a second direction which intersects with the first direction and covering the opening portion; and an insulation sheet covering at least a portion of an outer surface of the peripheral wall, wherein a distal end of the peripheral wall projects in the second direction beyond an outer surface of the insulation sheet.

10. The energy storage device according to claim 9, wherein a distal end of the peripheral wall is formed such that one surface of the distal end opposedly faces an edge surface of the insulation sheet and other surface of the distal end is welded to the lid plate.

11. An energy storage apparatus comprising:

the energy storage device according to claim 1; and a bus bar member.

* * * * *